United States Patent
Choi (10) Patent No.: US 10,940,826 B2
(45) Date of Patent: Mar. 9, 2021

(54) PASSENGER AIRBAG INFLATOR AND SYSTEM FOR VEHICLE

(71) Applicants: HYUNDAI MOTOR COMPANY, Seoul (KR); KIA MOTORS CORPORATION, Seoul (KR)

(72) Inventor: Jun Yeol Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 108 days.

(21) Appl. No.: 16/432,442

(22) Filed: Jun. 5, 2019

(65) Prior Publication Data

US 2020/0180549 A1 Jun. 11, 2020

(30) Foreign Application Priority Data

Dec. 11, 2018 (KR) ......................... 10-2018-0159085

(51) Int. Cl.
*B60R 21/264* (2006.01)
*B60R 21/263* (2011.01)
(Continued)

(52) U.S. Cl.
CPC .... *B60R 21/2644* (2013.01); *B60R 21/01516* (2014.10); *B60R 21/261* (2013.01);
(Continued)

(58) Field of Classification Search
CPC ........ B60R 2021/2648; B60R 21/2644; B60R 2021/2642; B60R 21/263; B60R 21/2633; B60R 21/2636
See application file for complete search history.

(56) References Cited

U.S. PATENT DOCUMENTS 5,400,487 A * 3/1995 Gioutsos ........... B60R 21/01534
280/735
5,413,378 A 5/1995 Steffens, Jr. et al.
(Continued)

FOREIGN PATENT DOCUMENTS

EP 1323594 A2 7/2003
EP 1564087 A1 8/2005
(Continued)

OTHER PUBLICATIONS

Extended European Search Report dated Jan. 3, 2020 issued in European Patent Application No. 19178320.8.
(Continued)

*Primary Examiner* — Jacob S. Scott
*Assistant Examiner* — Matthew D Lee
(74) *Attorney, Agent, or Firm* — Morgan, Lewis & Bockius LLP (57) ABSTRACT

A passenger airbag inflator for a vehicle includes: a housing having a first gunpowder therein, including a vent hole, and communicating with an airbag cushion; a first chamber located in a first side inner space of the housing, having a first booster and a first igniter, and configured to be triggered forwardly when the first igniter is ignited; and a second chamber located in a second side inner space of the housing, having a second booster and a second gunpowder, including a second igniter, and configured to be triggered forwardly when the second igniter is ignited.

11 Claims, 8 Drawing Sheets

(51) Int. Cl.
*B60R 21/015* (2006.01)
*B60R 21/261* (2011.01)
B60R 21/01 (2006.01)
B60R 21/26 (2011.01)

(52) U.S. Cl.
CPC .............. *B60R 2021/01211* (2013.01); *B60R 2021/26029* (2013.01); *B60R 2021/2633* (2013.01); *B60R 2021/2642* (2013.01); *B60R 2021/2648* (2013.01)

(56) References Cited

U.S. PATENT DOCUMENTS

| | | | |
|---|---|---|---|
| 5,622,380 A * | 4/1997 | Khandhadia | B60R 21/2644 102/531 |
| 6,341,252 B1 | 1/2002 | Foo et al. | |
| 8,556,294 B1 | 10/2013 | Norman, III | |
| 9,452,729 B2 * | 9/2016 | Bierwirth | B60R 21/261 |
| 9,463,765 B1 | 10/2016 | Mayville | |
| 2005/0184498 A1 | 8/2005 | Trevillyan et al. | |
| 2008/0257195 A1 | 10/2008 | Nakayasu et al. | |
| 2010/0071580 A1 | 3/2010 | Nakayasu et al. | |
| 2016/0052483 A1 | 2/2016 | Bierwirth et al. | |
| 2016/0137153 A1 | 5/2016 | Kim | |
| 2017/0361796 A1 | 12/2017 | Kim et al. | |

FOREIGN PATENT DOCUMENTS

| | | |
|---|---|---|
| JP | 2000-313304 A | 11/2000 |
| KR | 10-2005-00045329 A | 5/2005 |
| KR | 10-0511120 B1 | 8/2005 |
| WO | 99/42339 A1 | 8/1999 |

OTHER PUBLICATIONS

Extended European Search Report dated Aug. 8, 2019 issued in European Patent Application No. 19178336.4.

* cited by examiner

PASSENGER AIRBAG INFLATOR AND SYSTEM FOR VEHICLE

CROSS REFERENCE TO RELATED APPLICATION

The present application claims priority to Korean Patent Application No. 10-2018-0159085, filed Dec. 11, 2018 in the Korean Intellectual Property Office, the entire contents of which is incorporated herein for all purposes by this reference.

TECHNICAL FIELD

The present disclosure relates to a passenger airbag inflator for a vehicle, the inflator capable of controlling an expansion speed of an airbag while securing stability against collision.

BACKGROUND

Generally, in the field of airbag for occupant safety, in case of a passenger seat, a distance between a crash pad and an occupant is so far that passenger airbags need to be deployed rapidly at a constant speed when a vehicle collides.

In recent automotive design, the crash pad has become slimmer, and therefore, the distance between the crash pad and a seat back is becoming farther. In this case, during a front collision of the vehicle, a passenger body is likely to be tilted forward due to the inertia caused by the collision. If an airbag is deployed at a high speed and high pressure, a child or a person with a smaller figure than average may collide with the airbag, causing his or her body to bounce back in rearward, resulting in serious injury to the passenger body, e.g., head.

Accordingly, an improved passenger airbag inflator is needed, which can prevent injury of passenger by controlling an expansion speed of an airbag.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in related art, and the present disclosure is intended to propose a passenger airbag inflator for a vehicle, the inflator being capable of controlling the expansion speed of an airbag while securing stability against collision, in the field of airbag for occupant safety.

According to an exemplary embodiment of the present disclosure, a passenger airbag inflator for a vehicle may include: a housing having a first gunpowder therein, including a vent hole through which gas flows in and out, and communicating with an airbag cushion through the vent hole; a first chamber located in a first side inner space of the housing, having a first booster and a first igniter for burning the first booster, and configured to be triggered from inside the housing in a forward direction by internal pressure caused when the first igniter is ignited, such that a first rear end of the first chamber and an inner wall of the housing are separated from each other; and a second chamber located in a second side inner space of the housing, having a second booster and a second gunpowder therein, including a second igniter for burning the second booster, and configured to be triggered from inside the housing toward the forward direction by internal pressure caused when the second igniter is ignited, such that a second rear end of the second chamber and the inner wall of the housing are separated from each other. The first chamber has a first side engaged with the second chamber through an engagement structure, such when the first chamber is triggered without the second chamber being triggered, the first chamber rotates about the first side and the first rear end at a second side, which is opposite to the first side, is separated from the inner wall of the housing.

When the first igniter and the second igniter are ignited simultaneously, the first igniter and the second igniter may be triggered simultaneously by internal pressure, such that the first rear end, the second rear end, and the inner wall of the housing are separated from each other.

The first rear end and the second rear end may be engaged with the engagement structure of the inner wall of the housing, respectively; when the first igniter is ignited, the first rear end may be separated from the engagement structure of the inner wall of the housing toward the forward direction, and the first rear end may be separated from the inner wall of the housing; and when the second igniter is ignited, the second rear end may be separated from the engagement structure of the inner wall of the housing toward the forward direction, and the second rear end may be separated from the inner wall of the housing.

The first rear end and the second rear end may be respectively provided with fixing tabs protruding outwardly; the inner wall of the housing may be provided with holding portions having shapes surrounding the respective fixing tabs; and the first rear end and the second rear end may be disposed in the respective holding portions and engaged therewith.

Each of the holding portions may include: a raised portion raised from the inner wall of the housing; a first bent portion bent from an upper end of the raised portion to surround an associated fixing tab; and a second bent portion bent upwardly from an end of the first bent portion, wherein the holding portions have elasticity so as to be opened when the fixing tabs are moved upward, so the fixing tabs are separated from the respective holding portions.

The first chamber may be formed on a side of a lower end portion thereof with a protruding portion protruding outside the first chamber; and the second chamber may be formed on a side of a lower end portion thereof with a recess recessed toward an inside of the second chamber, wherein a shape of the recess corresponds to a shape of the protruding portion, and the protruding portion of the first chamber is disposed in the recess of the second chamber such that the protruding portion of the first chamber and the recess of the second chamber are engaged with each other.

The first chamber and the second chamber have a cylindrical shape when combined, an upper portion of the first chamber and an upper portion of the second chamber may be spaced apart from each other by a predetermined distance such that a space is defined between the upper portion of the first chamber and the upper portion of the second chamber, and each area of an upper surface and a lower surface of the second chamber may be formed to be larger than each area of an upper surface and a lower surface of the first chamber such that a volume of the second chamber is larger than a volume of the first chamber.

An upper surface of the protruding portion of the first chamber may be inclined such that an outer side portion of the protruding portion of the first chamber is disposed at a position higher than an inner side portion of the protruding portion of the first chamber.

An outer side portion of an upper surface of the protruding portion of the first chamber may be provided with a protrusion protruding upward.

The inflator may further include a guide cap being provided inside the housing at a position facing upper surfaces of the first chamber and the second chamber, and protruding toward an inside of the housing along edges of the upper surfaces of the first chamber and the second chamber, wherein, when the first chamber or the second chamber is triggered, the upper surface of the first chamber or the second chamber is disposed inside the guide cap.

According to another exemplary embodiment of the present disclosure, a passenger airbag system for a vehicle having a passenger airbag inflator which includes a housing having a first gunpowder therein, including a vent hole through which gas flows in and out, and communicating with an airbag cushion through the vent hole; a first chamber located in a first side inner space of the housing, having a first booster inside the first chamber, including a first igniter for burning the first booster, and configured to be triggered from inside the housing in a forward direction by internal pressure caused when the first igniter is ignited, such that a first rear end of the first chamber and an inner wall of the housing are separated from each other; and a second chamber located in a second side inner space of the housing, having a second booster and a second gunpowder inside the second chamber, including a second igniter for burning the second booster, and configured to be triggered from inside the housing in the forward direction by internal pressure caused when the second igniter is ignited, such that a second rear end of the second chamber and the inner wall of the housing are separated from each other, wherein the first chamber has a first side engaged with the second chamber through an engagement structure such that, when the first chamber is triggered without the second chamber being triggered, the first chamber rotates about the first side, and the first rear end at a second side, which is opposite to the first side, is separated from the inner wall of the housing, wherein, when a passenger with a weight equal to or less than a reference value is seated in a vehicle seat, a controller triggers the first chamber without the second chamber being triggered to allow the second igniter to be ignited after a predetermined time elapses after the first igniter is ignited, and wherein, when a passenger with a weight more than the reference value is seated in the vehicle seat, the controller triggers the first chamber and the second chamber are, simultaneously, to allow the first igniter and the second igniter to be ignited simultaneously.

According to the passenger airbag inflator and system for a vehicle, it is possible to control the expansion speed of airbag while securing stability against collision.

In particular, by controlling the pressure distribution by airbag inflation stages according to vehicle and collision conditions, it is possible to prevent passenger injury with efficient gas operation.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinbelow, exemplary embodiments of the present disclosure will be described in detail with reference to the accompanying drawings.

Figure 1:
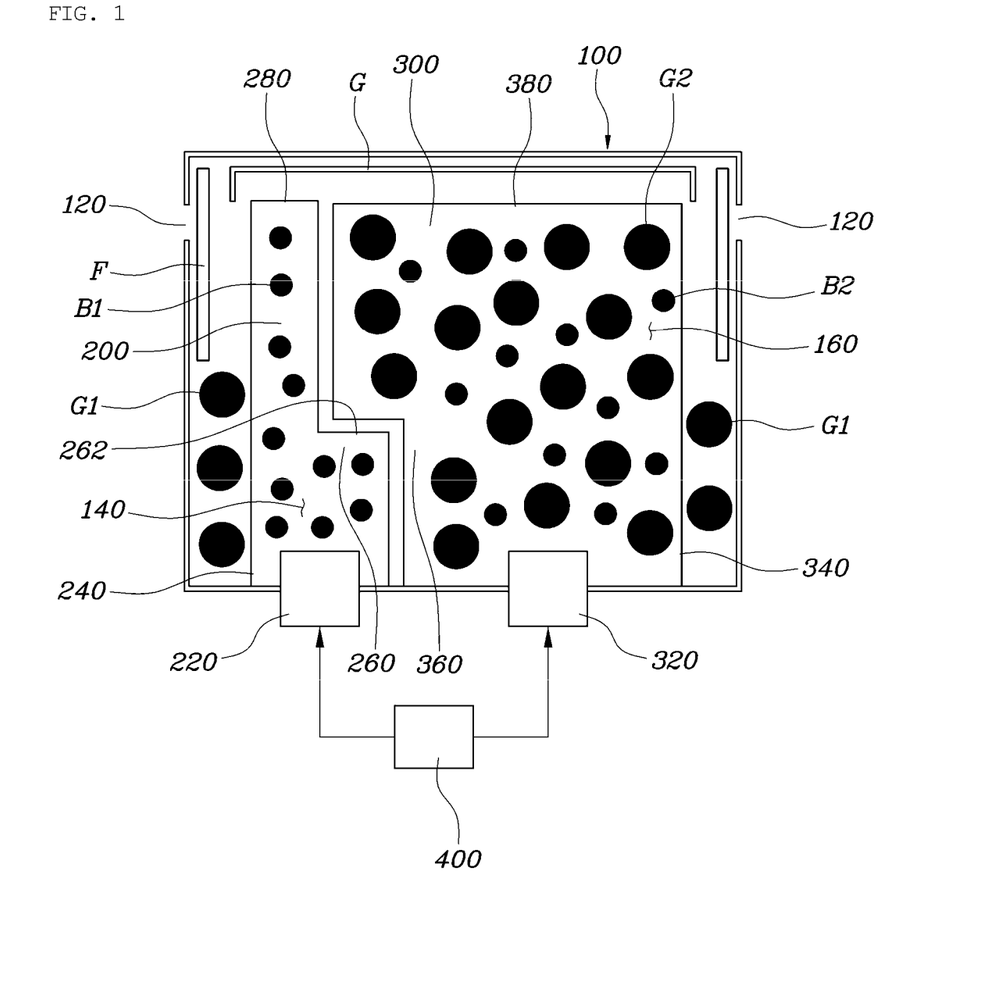
FIG. 1 is a view showing a passenger airbag inflator for a vehicle according to an exemplary embodiment of the present disclosure.
Figure 2:
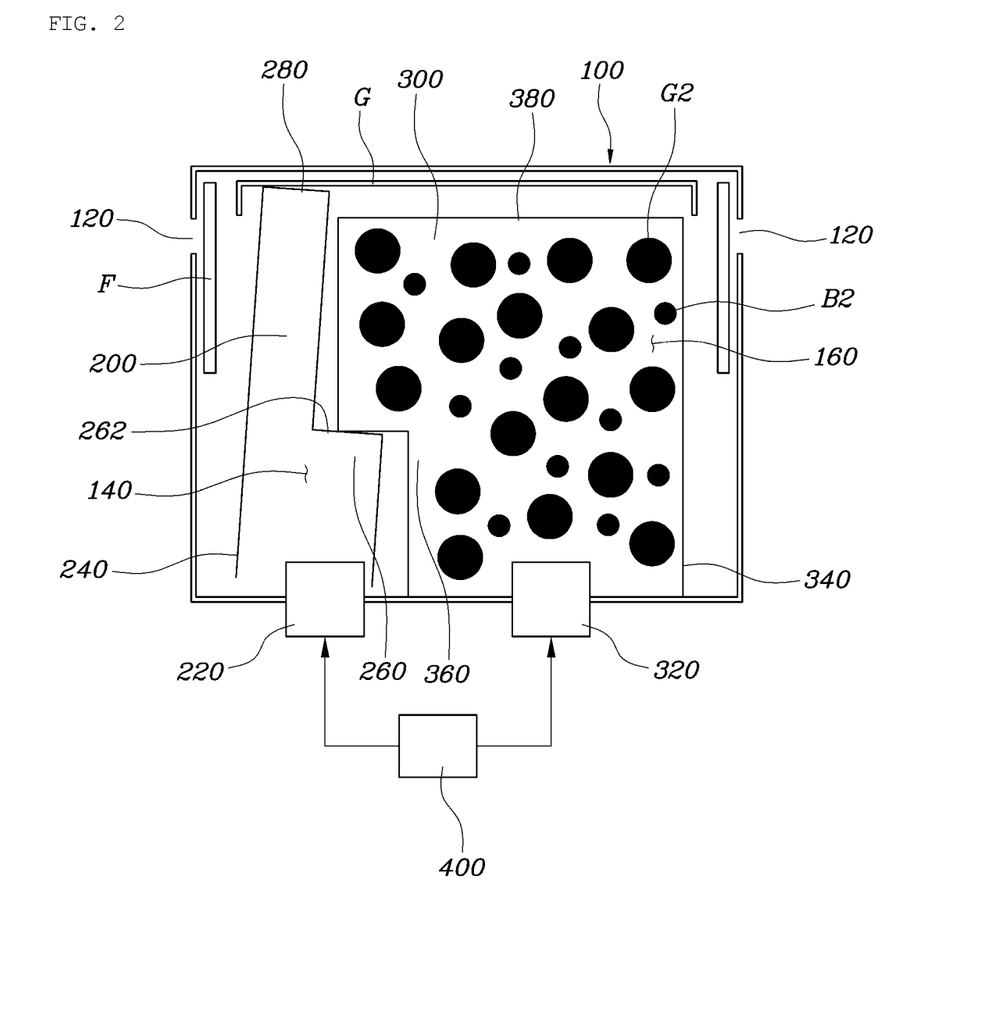
FIG. 2 is a view showing a state where a first chamber of the passenger airbag inflator for a vehicle according to the exemplary embodiment of the present disclosure is triggered.
Figure 3:
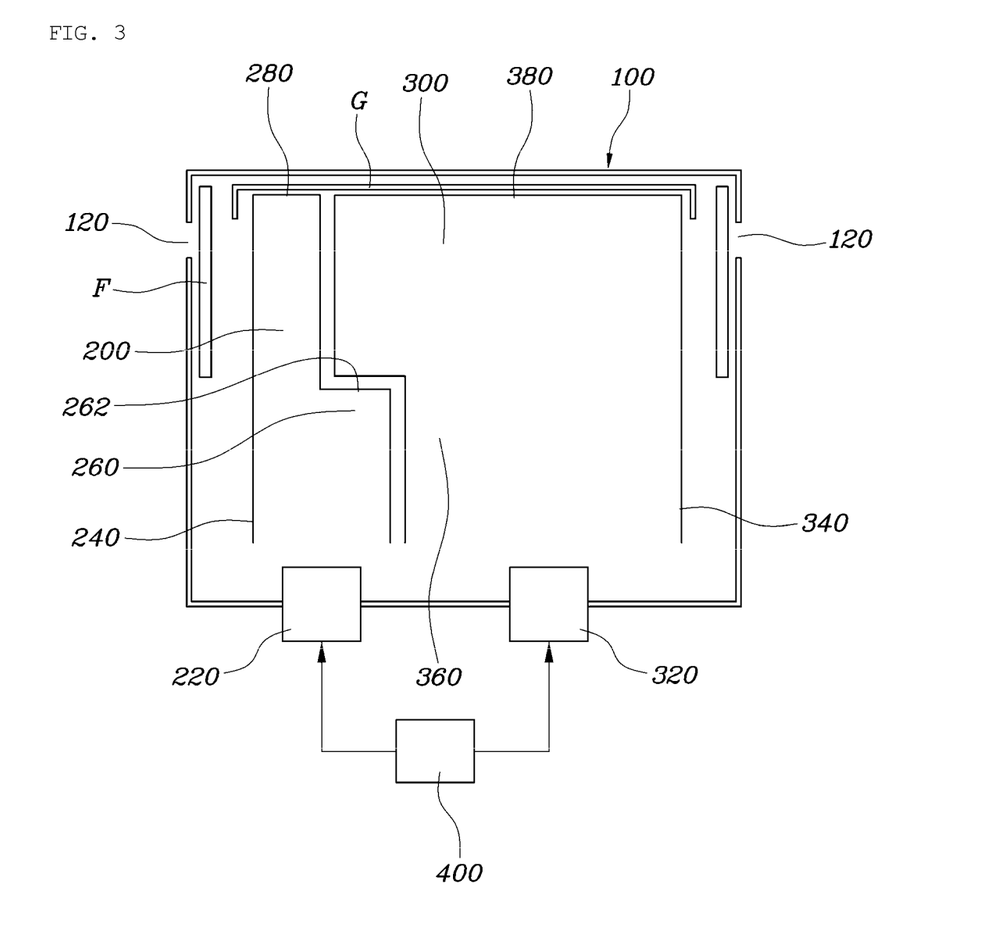
FIG. 3 is a view showing a state where the first chamber and a second chamber of the passenger airbag inflator for a vehicle according to the exemplary embodiment of the present disclosure are triggered.
Figure 4:
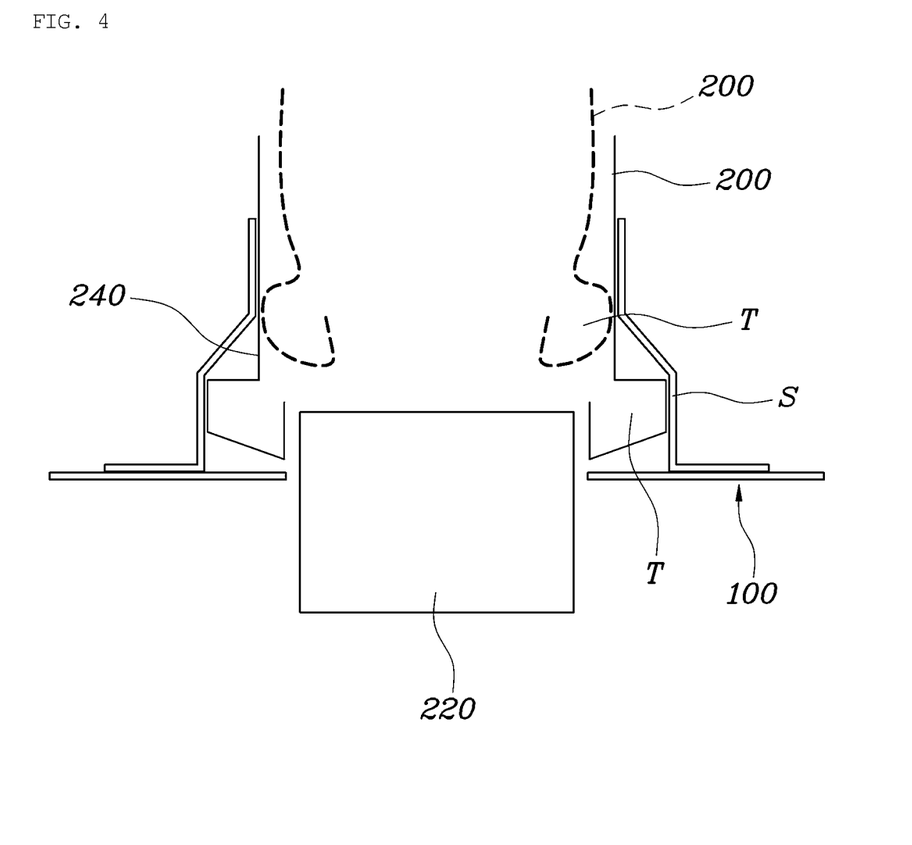
FIGS. 4 and 10 are views showing a state where a rear end of the first chamber of the passenger airbag inflator for a vehicle according to the exemplary embodiment of the present disclosure is engaged with an inner wall of the housing.
Figure 5:
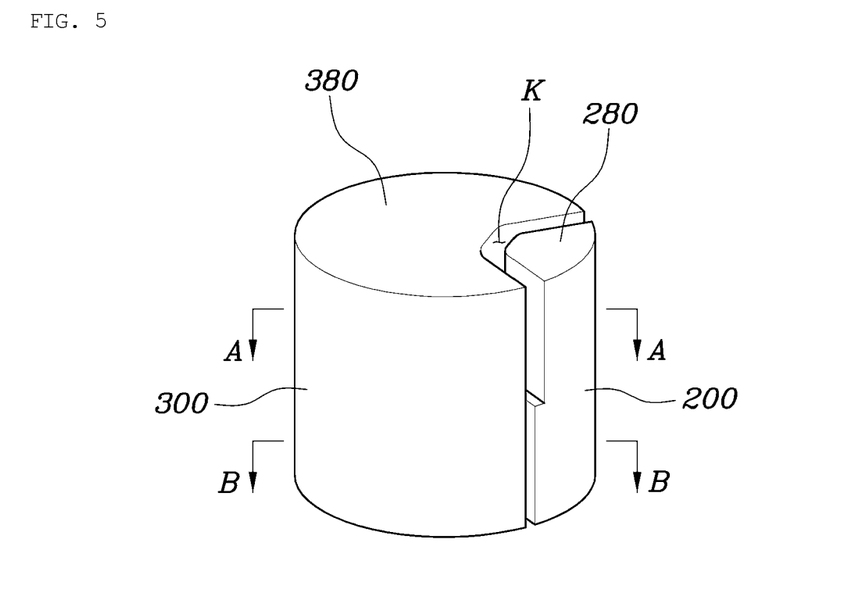
FIG. 5 is a view showing a state where the first chamber and the second chamber of the passenger airbag inflator for a vehicle according to another exemplary embodiment of the present disclosure are coupled to each other.
Figure 6:
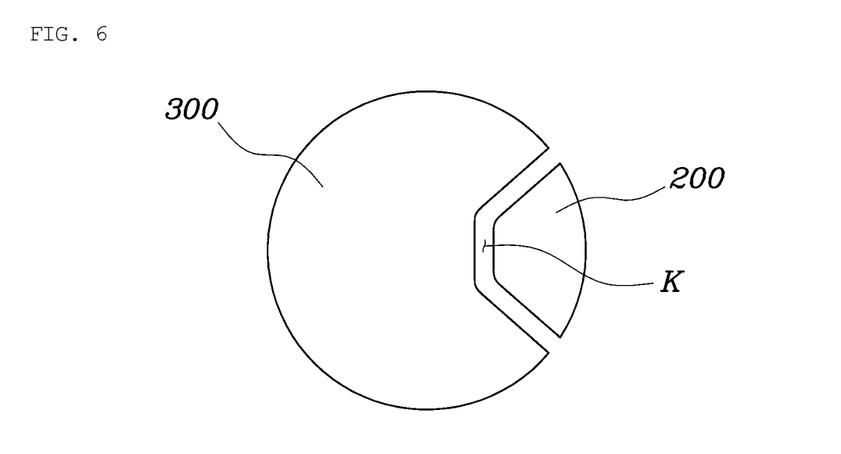
FIG. 6 is a sectional view taken along line A-A of FIG. 5.
Figure 7:
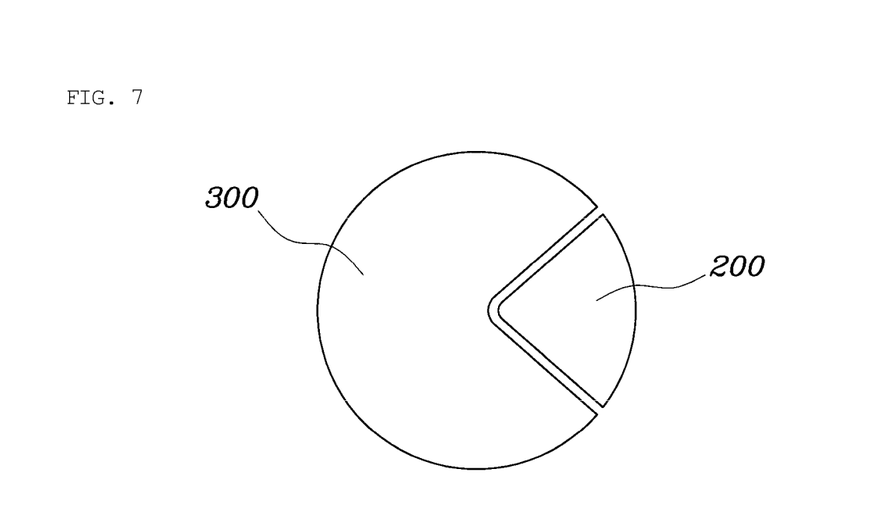
FIG. 7 is a sectional view taken along line B-B of FIG. 5.
Figure 8:
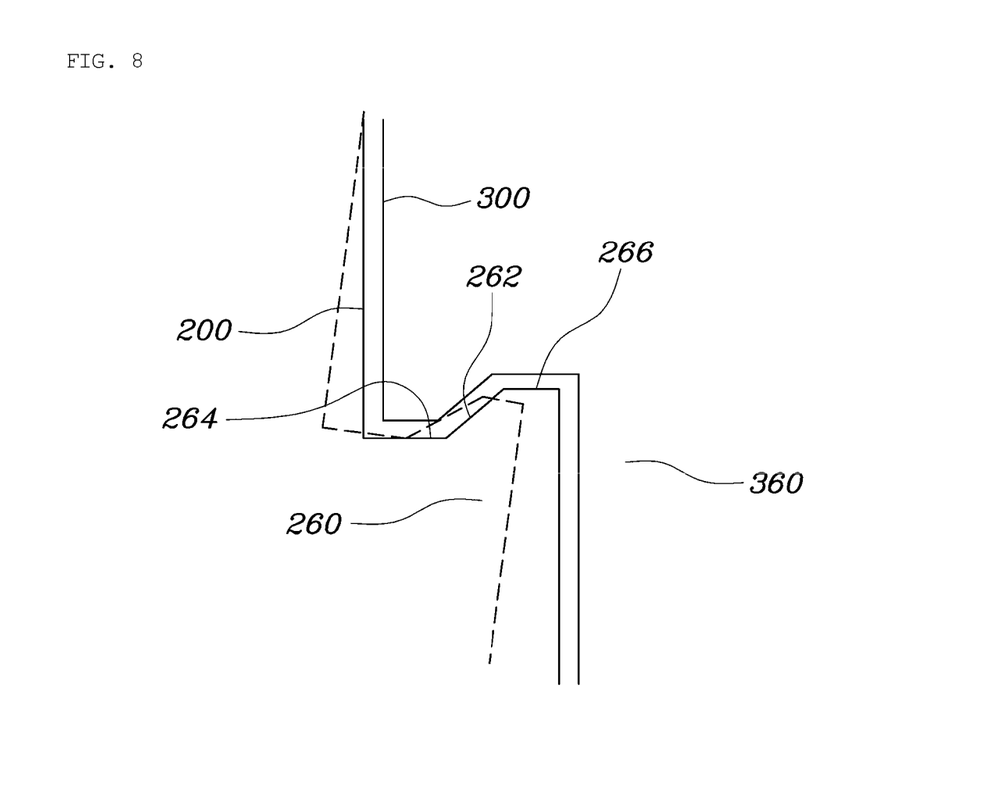
FIG. 8 is a view showing a state where a protruding portion of the first chamber and a recess of the second chamber of the passenger airbag inflator for a vehicle according to a further exemplary embodiment of the present disclosure are engaged with each other.
Figure 9:
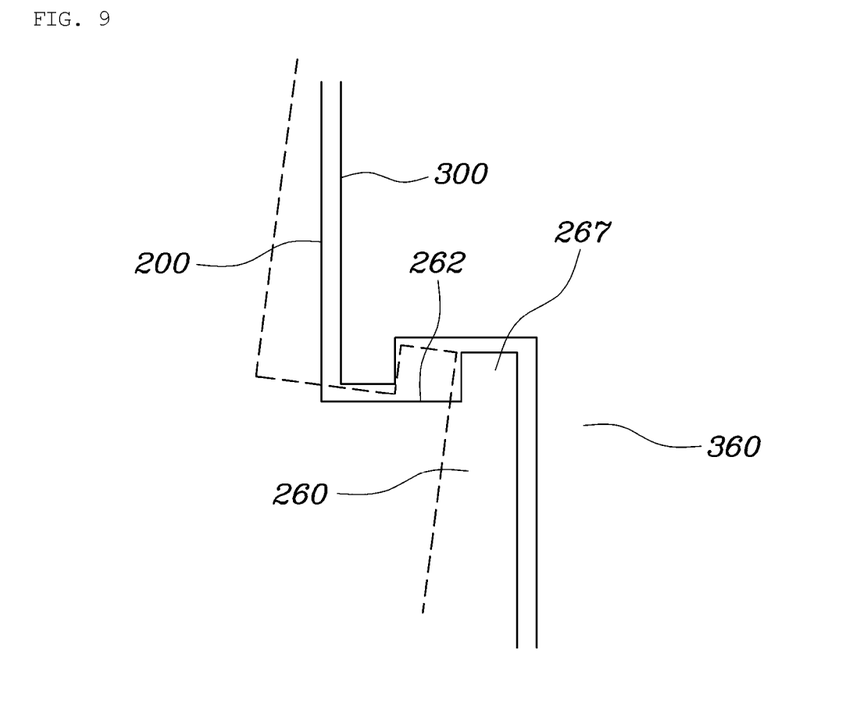
FIG. 9 is a view showing a state where a protruding portion of the first chamber and a recess of the second chamber of the passenger airbag inflator for a vehicle according to further another exemplary embodiment of the present disclosure are engaged with each other.
Figure 10:
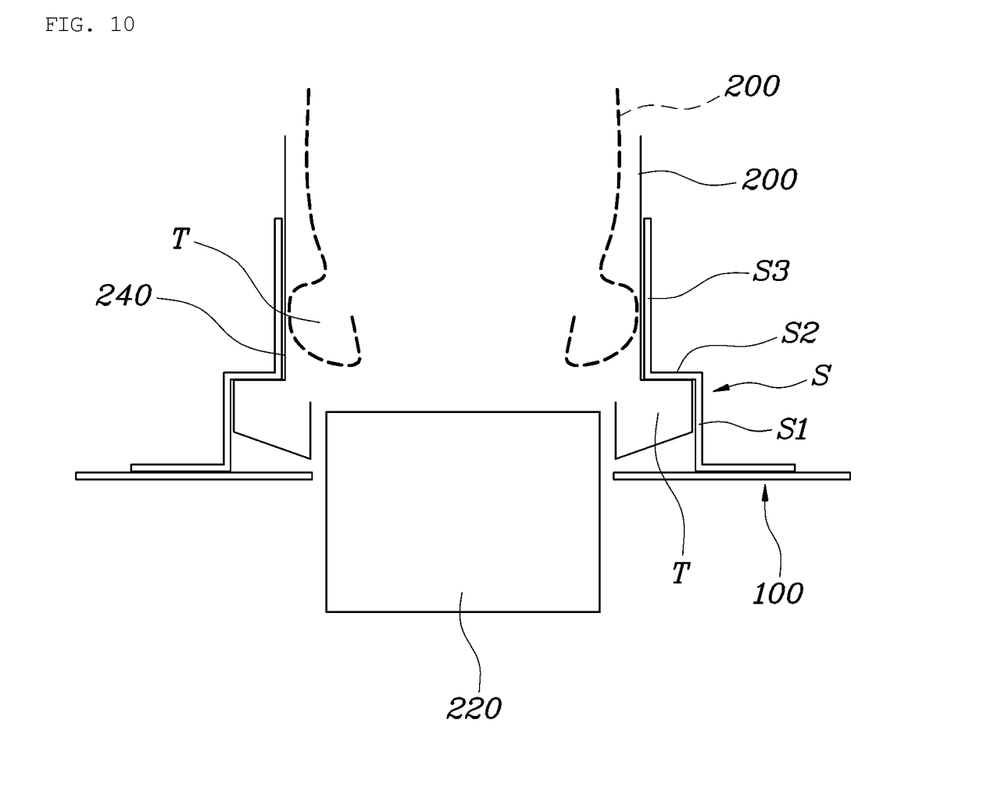

FIG. 1 is a view showing a passenger airbag inflator for a vehicle according to an embodiment of the present disclosure; FIG. 2 is a view showing a state where a first chamber of the passenger airbag inflator for a vehicle according to the embodiment of the present disclosure is triggered; FIG. 3 is a view showing a state where the first chamber and a second chamber of the passenger airbag inflator for a vehicle according to the embodiment of the present disclosure are triggered; FIGS. 4 and 10 are views showing a state where a rear end of the first chamber of the passenger airbag inflator for a vehicle according to the embodiment of the present disclosure is engaged with an inner wall of the housing; FIG. 5 is a view showing a state where the first chamber and the second chamber of the passenger airbag inflator for a vehicle according to another embodiment of the present disclosure are coupled to each other; FIG. 6 is a sectional view taken along line A-A of FIG. 5; FIG. 7 is a sectional view taken along line B-B of FIG. 5; FIG. 8 is a view showing a state where a protruding portion of the first chamber and a recess of the second chamber of the passenger airbag inflator for a vehicle according to a further embodiment of the present disclosure are engaged with each other; and FIG. 9 is a view showing a state where a protruding portion of the first chamber and a recess of the second chamber of the passenger airbag inflator for a vehicle according to further another embodiment of the present disclosure are engaged with each other.

As shown in FIGS. 1 and 2, a passenger airbag inflator for a vehicle of the present disclosure includes: a housing 100 having a first gunpowder G1 therein, including a vent hole 120 through which gas flows in and out, and communicating with an airbag cushion through the vent hole 120; a first chamber 200 located in a first side inner space 140 of the housing 100, having a first booster B1 therein, including a first igniter 220 for burning the first booster, and configured to be triggered from inside the housing 100 in a forward direction by internal pressure caused when the first igniter 220 is ignited, such that a first rear end 240 of the first chamber 200 and an inner wall of the housing 100 are separated from each other; and a second chamber 300 located in a second side inner space 160 of the housing 100, having a second booster B2 and a second gunpowder G2 therein, having a second igniter 320 for burning the second booster B2, and configured to be triggered from inside the housing 100 in the forward direction by internal pressure caused when the second igniter 320 is ignited, such that a second rear end 340 of the second chamber 300 and the inner wall of the housing 100 are separated from each other.

The first booster B1 and the second booster B2 are ignition agents, and the first gunpowder G1 and the second gunpowder G2 are gas generators. When an airbag sensor or the like detects a collision, it sends a signal to a controller 400, and the controller 400 controls an ignition current to flow through the first igniter 220 and the second igniter 320, such that the first booster B1 and the second booster B2 are burned. When the first booster B1 and the second booster B2 as the ignition agents are burned, by the heat generated therefrom, the first gunpowder G1 and the second gunpowder G2 as the gas generators are burned. Nitrogen gas, which is rapidly generated by combustion, flows into the airbag cushion via the vent hole 120. Further, a filter F serves to remove foreign substances of combustion gas. Herein, the controller 400 may be a processor such as a central processing unit (CPU) or the like for carrying out instructions.

Referring to FIGS. 1 and 2, the first chamber 200 may be located in the housing 100 with a first side thereof engaged with the second chamber 300 through an engagement structure, such that the first chamber 200 can rotate about the first side thereof and the first rear end 240 at a second side that is an opposite side to the first side is separated from the inner wall of the housing 100 when the first chamber 200 is triggered without the second chamber 300 being triggered. As shown in FIG. 2, when only the first chamber 200 is triggered, the first chamber 200 can be stopped by the second chamber 300, whereby the first chamber 200 can rotate to be separated from the inner wall of the housing 100. Since the first rear end 240 of the first chamber 200 is not entirely separated from the inner wall of the housing 100, the first gunpowder G1 can be burned slowly, which lowers a speed and a pressure in an initial stage of deployment of an airbag. Accordingly, even when the upper body is tilted forward and comes into contact with the airbag, the airbag is not deployed under high pressure, which reduces the likelihood of passenger injury. Further, in a later stage of deployment of the airbag, the second chamber 300 can be triggered, and the second booster B2 and the second gunpowder G2 are burned such that the airbag can be fully deployed.

As shown in FIG. 3, when the first igniter 220 and the second igniter 320 are ignited simultaneously, the first chamber 200 and the second chamber 300 are triggered simultaneously by the internal pressure, such that the first rear end 240 of the first chamber 200 and the second rear end 340 of the second chamber 300 may be simultaneously separated from the inner wall of the housing 100. In case of high-speed front collision of vehicle, there is a need to rapidly deploy the airbag. In this case, the first chamber 200 and the second chamber 300 can be triggered simultaneously to fully deploy the airbag at once.

Referring to FIGS. 3 to 4, and 10, the first rear end 240 and the second rear end 340 may be engaged with the engagement structure of the inner wall of the housing 100. When the first igniter 220 is ignited, each of the first rear end 240 of the first chamber 200 may be separated from the engagement structure of the inner wall of the housing 100 toward the forward direction, and the first rear end 240 may be separated from the inner wall of the housing 100. When the second igniter 320 is ignited, the second rear end 340 may be separated from the engagement structure of the inner wall of the housing 100 toward the forward direction, and the second rear end 340 of the second chamber 300 may be separated from the inner wall of the housing 100. In other words, the first rear end 240 and the second rear end 340 may respectively have fixing tabs T protruding outwardly, the inner wall of the housing 100 may have holding portions S having shapes surrounding the respective fixing tabs T, and the first rear end 240 and the second rear end 340 may be inserted in the holding portions S and engaged therewith. Referring to FIG. 10, each of the holding portions S may include: a raised portion S1 raised from the inner wall of the housing 100; a first bent portion S2 bent from an upper end of the raised portion S1 to surround the fixing tab T; and a second bent portion S3 bent upwardly from an end of the first bent portion S2, wherein the holding portions S have elasticity so as to be opened when the fixing tabs T are moved upward, so the fixing tabs T are separated from the respective holding portions S. As such, by forming the engagement structure, the first chamber 200 or the second chamber 300 is coupled to the inner wall of the housing 100 by force fitting, which facilitates coupling ensuring rigidity. Further, when the first chamber 200 is triggered, the first rear end 240 of the first chamber 200 may be spaced away from the inner wall of the housing 100 by being bent due to the high temperature gas as shown by the dotted line of FIG. 10.

The above engagement structure and the triggering pattern of the first chamber 200 can be applied to the second chamber 300.

Referring to FIGS. 1 to 3, the first chamber 200 include, on a side of a lower end portion thereof, a protruding portion 260 protruding outside the first chamber 200; and the second chamber 300 may include, on a side of a lower end portion thereof, a recess 360 recessed toward the inside of the second chamber 300, wherein a shape of the recess 360 corresponds to a shape of the protruding portion 260, and the protruding portion 260 of the first chamber 200 is inserted in the recess 360 of the second chamber 300 such that the protruding portion 260 of the first chamber 200 and the recess 360 of the second chamber 300 are engaged with each other. As the engagement structure is formed by the protruding portion 260 and the recess 360 corresponding to the shape of the protruding portion 260, when the first chamber 200 is triggered, the first rear end 240 of the first chamber 200 is not completely separated but is rotated about the protruding portion 260 and the recess 360 such that only one side is firstly spaced, and thus, an initial expansion speed of the airbag can be controlled.

Further, as shown in FIGS. 1, and 5 to 7, a cylindrical shape may be formed when the first chamber 200 and the second chamber 300 are coupled to each other; an upper portion of the first chamber 200 and an upper portion of the second chamber 300 may be spaced apart from each other by a predetermined distance such that a space K is defined between the upper portion of the first chamber 200 and the upper portion of the second chamber 300; and areas of an upper surface 380 and a lower surface of the second chamber 300 may be larger than areas of an upper surface 280 and a lower surface of the first chamber 200 such that the volume of the second chamber 300 is larger than the volume of the first chamber 200. In the case of the present disclosure, since an initial expansion speed of the airbag is relatively slow when only the first igniter 220 is ignited, the expansion speed and deployment pressure of the airbag need to be increased when the second igniter 320 is ignited. Accordingly, as described above, by increasing the volume of the second chamber 300, the amount of the second booster B2 and the second gunpowder G2 inside the second chamber 300 can be increased, whereby it is possible to increase the later expansion speed of the airbag. As shown in FIGS. 1, and 5 to 6, as the space K is defined between the upper portion of the first chamber 200 and the upper portion of the second chamber 300, the first chamber 200 can be rotated by being tilted toward the space K.

Further, as shown in FIG. 8, an upper surface 262 of the protruding portion 260 of the first chamber 200 may be inclined such that an outer side portion 266 of the protruding portion 260 of the first chamber 200 can be disposed at a position higher than an inner side portion 264 of the protruding portion 260 of the first chamber 200. As such, by having a slope, the first chamber 200 can be rapidly slid as indicated by the dotted line to be separated from the inner wall of the housing 100.

Further, as shown in FIG. 9, at the outer side portion 266 of the upper surface 262 of the protruding portion 260 of the first chamber 200, a protrusion 267 may protrude upward. As such, a step structure can be formed between the first chamber 200 and the second chamber 300, and thus, even if the first booster B1 is burned, it is possible to prevent the first gunpowder G1 from burning excessively. As a result, when the second chamber 300 is not triggered, the initial deployment pressure of the airbag can be reduced.

Referring to FIGS. 1 to 3, the inflator may further include a guide cap G inside the housing 100 at a position facing the upper surface 280 of the first chamber 200 and the upper surface 380 of the second chamber 300, protruding toward an inside of the housing 100 along edges of the upper surface 280 of the first chamber 200 and the upper surface 380 of the second chamber 300. When the first chamber 200 or the second chamber 300 is triggered, the upper surface 280 of the first chamber 200 or the upper surface 380 of the second chamber 300 is disposed inside the guide cap G. Through this, the first chamber 200 or the second chamber 300 can maintain the consistency of movement during upward movement, and it is possible to prevent the first chamber 200 or the second chamber 300 from blocking the vent hole 120, thereby preventing the airbag from not being deployed.

According to a passenger airbag system for a vehicle having the passenger airbag inflator for a vehicle, when it is detected that a passenger with a weight equal to or less than a reference value is seated in a vehicle seat, it is determined that the first chamber 200 is triggered without the second chamber 300 being triggered, so as to allow the second igniter 320 to be ignited after a predetermined time elapses after the first igniter 220 is ignited. When it is detected that a passenger with a weight more than the reference value is seated in the vehicle seat, it is determined that the first chamber 200 and the second chamber 300 are triggered simultaneously, so as to allow the first igniter 220 and the second igniter 320 to be ignited simultaneously.

That is, when a passenger with a weight equal to or less than the reference value is seated in the vehicle seat, the controller 400 firstly triggers only the first chamber 200 to induce the initial deployment pressure of the airbag to be low, and then triggers the second chamber 300 to fully deploy the airbag. Further, when a passenger with a weight more than the reference value is seated in the vehicle seat, the controller triggers the first chamber 200 and the second chamber 300 simultaneously to fully deploy the airbag at once. As such, the reference value for dividing the airbag system may vary depending on the internal design of the vehicle and the shape and size of the seat.

Although exemplary embodiments of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A passenger airbag inflator for a vehicle, the inflator comprising:
   a housing having a first gunpowder therein, including a vent hole through which gas flows in and out, and communicating with an airbag cushion through the vent hole;
   a first chamber located in a first side inner space of the housing, having a first booster inside the first chamber, including a first igniter for burning the first booster, and configured to be triggered from inside the housing in a forward direction by internal pressure caused when the first igniter is ignited, such that a first rear end of the first chamber and an inner wall of the housing are separated from each other; and
   a second chamber located in a second side inner space of the housing, having a second booster and a second gunpowder inside the second chamber, including a second igniter for burning the second booster, and configured to be triggered from inside the housing in the forward direction by internal pressure caused when the second igniter is ignited, such that a second rear end of the second chamber and the inner wall of the housing are separated from each other,
   wherein the first chamber has a first side engaged with the second chamber through an engagement structure such that, when the first chamber is triggered without the second chamber being triggered, the first chamber rotates about the first side and the first rear end at a second side, which is opposite to the first side, is separated from the inner wall of the housing.

2. The inflator of claim 1, wherein, when the first igniter and the second igniter are ignited simultaneously, the first chamber and the second chamber are triggered simultaneously by internal pressure, such that the first rear end of the first chamber, the second rear end of the second chamber, and the inner wall of the housing are separated from each other.

3. The inflator of claim 1, wherein the first rear end and the second rear end are engaged with the engagement structure of the inner wall of the housing,
   wherein, when the first igniter is ignited, the first rear end is separated from the engagement structure of the inner wall of the housing in the forward direction such that the first rear end of the first chamber is separated from the inner wall of the housing, and
   wherein, when the second igniter is ignited, the second rear end is separated from the engagement structure of the inner wall of the housing in the forward direction such that the second rear end is separated from the inner wall of the housing.

4. The inflator of claim 3, wherein the first rear end and the second rear end respectively include fixing tabs protruding outwardly;

the inner wall of the housing includes holding portions having shapes surrounding the respective fixing tabs; and the first rear end and the second rear end are disposed in and engaged with the respective holding portions.

5. The inflator of claim 4, wherein each of the holding portions includes:

a raised portion raised from the inner wall of the housing;

a first bent portion bent inwardly from an upper end of the raised portion to surround an associated fixing tab; and a second bent portion bent upwardly from a first end of the first bent portion, wherein the first end of the first bend portion is opposite to a second end that is connected to the upper end of the raised portion, wherein the holding portions have elasticity, such that when the fixing tabs move upwardly, the holding portions are opened and the fixing tabs are separated from the respective holding portions.

6. The inflator of claim 1, wherein the first chamber includes a protruding portion protruding outside the first chamber at a lower end side of the first chamber; and the second chamber includes a recess recessed toward an inside of the second chamber at a lower end side of the second chamber, wherein a shape of the recess corresponds to a shape of the protruding portion, and the protruding portion of the first chamber is disposed in the recess of the second chamber such that the protruding portion and the recess are engaged with each other.

7. The inflator of claim 6, wherein the first chamber and the second chamber have a cylindrical shape when combined, an upper portion of the first chamber and an upper portion of the second chamber are spaced apart from each other by a predetermined distance, and each area of an upper surface and a lower surface of the second chamber is larger than each area of an upper surface and a lower surface of the first chamber, such that a volume of the second chamber is larger than a volume of the first chamber.

8. The inflator of claim 7, wherein an upper surface of the protruding portion of the first chamber is inclined at an angle greater than 0 (zero) such that an outer side portion of the protruding portion is disposed at a position higher than an inner side portion of the protruding portion.

9. The inflator of claim 7, wherein the protruding portion includes a protrusion protruding upwards at an outer side portion of an upper surface of the protruding portion.

10. The inflator of claim 1, further comprising:

a guide cap disposed inside the housing at a position facing upper surfaces of the first chamber and the second chamber, the guide cap protruding toward an inside of the housing along edges of the upper surfaces of the first chamber and the second chamber, wherein, when the first chamber or the second chamber is triggered, the upper surface of the first chamber or the second chamber is disposed inside the guide cap.

11. A passenger airbag system for a vehicle having a passenger airbag inflator which includes:

a housing having a first gunpowder therein, including a vent hole through which gas flows in and out, and communicating with an airbag cushion through the vent hole;

a first chamber located in a first side inner space of the housing, having a first booster inside the first chamber, including a first igniter for burning the first booster, and configured to be triggered from inside the housing in a forward direction by internal pressure caused when the first igniter is ignited, such that a first rear end of the first chamber and an inner wall of the housing are separated from each other; and a second chamber located in a second side inner space of the housing, having a second booster and a second gunpowder inside the second chamber, including a second igniter for burning the second booster, and configured to be triggered from inside the housing in the forward direction by internal pressure caused when the second igniter is ignited, such that a second rear end of the second chamber and the inner wall of the housing are separated from each other, wherein the first chamber has a first side engaged with the second chamber through an engagement structure such that, when the first chamber is triggered without the second chamber being triggered, the first chamber rotates about the first side, and the first rear end at a second side, which is opposite to the first side, is separated from the inner wall of the housing, wherein, when a passenger with a weight equal to or less than a reference value is seated in a vehicle seat, a controller triggers the first chamber without the second chamber being triggered to allow the second igniter to be ignited after a predetermined time elapses after the first igniter is ignited, and wherein, when a passenger with a weight more than the reference value is seated in the vehicle seat, the controller triggers the first chamber and the second chamber, simultaneously, to allow the first igniter and the second igniter to be ignited simultaneously.

* * * * *